US 12,440,092 B2

(12) United States Patent
Hallauer et al.

(10) Patent No.: US 12,440,092 B2
(45) Date of Patent: Oct. 14, 2025

(54) FLEXING STRUCTURE WITH CUTOUTS FOR A MEDICAL DEVICE

(71) Applicant: AXESS VISION TECHNOLOGY, Joue-les-Tours (FR)

(72) Inventors: Emmanuel Hallauer, Sache (FR); Pascal Cochard, Dierre (FR)

(*) Notice: Subject to any disclaimer, the term of this patent is extended or adjusted under 35 U.S.C. 154(b) by 458 days.

(21) Appl. No.: 17/793,053

(22) PCT Filed: Jan. 15, 2021

(86) PCT No.: PCT/FR2021/050071
§ 371 (c)(1),
(2) Date: Jul. 15, 2022

(87) PCT Pub. No.: WO2021/144542
PCT Pub. Date: Jul. 22, 2021

(65) Prior Publication Data
US 2023/0069698 A1 Mar. 2, 2023

(30) Foreign Application Priority Data
Jan. 17, 2020 (FR) ...................................... 2000478

(51) Int. Cl.
*A61B 1/00* (2006.01)
*A61B 1/005* (2006.01)
(Continued)

(52) U.S. Cl.
CPC .......... *A61B 1/0055* (2013.01); *A61B 1/0052* (2013.01); *A61B 1/0057* (2013.01);
(Continued)

(58) Field of Classification Search
CPC ... A61B 1/0055; A61B 1/0052; A61B 1/0057; A61B 1/008; A61M 25/0013; A61M 25/0138
See application file for complete search history.

(56) References Cited

U.S. PATENT DOCUMENTS

| 5,002,041 A | 3/1991 | Chikama |
| 7,766,821 B2 | 8/2010 | Brunnen |

(Continued)

FOREIGN PATENT DOCUMENTS

| CN | 104605805 A | 5/2015 |
| CN | 107520273 A | 12/2017 |

(Continued)

OTHER PUBLICATIONS

English language abstract of JP 2013223655.
(Continued)

*Primary Examiner* — Timothy J Neal
(74) *Attorney, Agent, or Firm* — Jonathan W. Bingham (57) ABSTRACT

A flexing structure for an insertion tube of a medical device including tubular vertebrae with a proximal tubular vertebra and a distal tubular vertebra and at least one actuating cable surrounded by a sheath over at least part of its length, the flexing structure including a tube cut with energy-beam cutting lines to create tubular vertebrae that nest in one another, the proximal tubular vertebra including, for each actuating cable, a radial and axial blocking system for the sheath, comprising an elongate cutout created in such a way as to delimit two stop edges that limit the radial engagement of the sheath in the cutout, this cutout opening at its distal part into a slot delimited by at least two cutout lines between which there is attached a pressing tab designed to press the sheath radially against the two stop edges of the cutout, this slot being bordered by a rim for axially stopping the sheath.

10 Claims, 9 Drawing Sheets

(51) Int. Cl.
*A61B 1/008* (2006.01)
*A61M 25/00* (2006.01)
*A61M 25/01* (2006.01)

(52) U.S. Cl.
CPC ......... *A61B 1/008* (2013.01); *A61M 25/0013* (2013.01); *A61M 25/0138* (2013.01)

(56) References Cited

U.S. PATENT DOCUMENTS

| | | |
|---|---|---|
| 2009/0005643 A1 | 1/2009 | Smith |
| 2010/0198016 A1 | 8/2010 | Tilson |
| 2015/0087910 A1 | 3/2015 | Okazaki |

FOREIGN PATENT DOCUMENTS

| | | |
|---|---|---|
| CN | 107951456 A | 4/2018 |
| CN | 208228927 U | 12/2018 |
| EP | 0626604 A2 | 11/1994 |
| EP | 1604607 A1 | 12/2005 |
| EP | 2130478 A1 | 12/2009 |
| EP | 3195784 A1 | 7/2017 |
| FR | 2740688 A1 | 5/1997 |
| JP | H02131401 U | 11/1990 |
| JP | 2013223655 A | 10/2013 |
| WO | 2008/139768 A1 | 11/2008 |
| WO | 2014/061842 A1 | 4/2014 |
| WO | 2014/106510 A | 7/2014 |

OTHER PUBLICATIONS

English language abstract of FR2740688.
English language abstract of CN107951456.
English language abstract of WO2008/139768.
English language abstract of CN104605805.
English language abstract of CN107520273.
English language abstract of EP0626604.
English language abstract of WO2014/061842.
English language summary and bibliographic data of JPH02131401U.
English language machine tranlsation of CN208228927U.

FLEXING STRUCTURE WITH CUTOUTS FOR A MEDICAL DEVICE

TECHNICAL FIELD

The present disclosure relates to the technical field of medical devices in the general sense enabling access to the inside of a body such as a cavity or a channel for example, and more specifically it is aimed at catheter-type medical devices and preferably endoscope-type medical devices.

The subject matter of the disclosure finds a particularly advantageous application for reusable or disposable endoscopes.

The present disclosure relates more specifically to the flexing structure enabling the orienting of the distal head of such catheter-type or endoscope-type medical devices, this distal head being suitable for ensuring multiple function such as visualisation, fluid supply, fluid suction, instrument supply, the collection of samples or the conduction of surgical procedures, for example.

The catheter-type or endoscope-type medical device equipped with the flexing structure of the distal head according to the disclosure has particularly advantageous applications for accessing the internal surface of a hollow organ, a cavity or a natural or artificial conduit of the human body with a view to performing various operations for therapeutic, surgical or diagnostic purposes.

The catheter-type or endoscope-type medical device according to the disclosure is used for diagnostic, therapeutic or surgical purposes, to inspect all the internal parts of the human body that are accessible via the natural or artificial paths. For example, the catheter-type or endoscope-type medical device according to the disclosure can be used in the field of urinary tract, gastrointestinal tract, the respiratory system, the cardiovascular system, the trachea, the sinus cavity, the female reproductive system, the abdominal cavity or any other part of the human body to be explored via a natural or artificial path.

BACKGROUND

In general, a medical endoscope includes, as described for example by the patent application WO 2014/106510, a control handle to which an insertion tube is attached. This tube includes a distal head equipped with an optical visualisation system for lighting and examining the organ, cavity or conduit of the human body. Upstream of this distal head, the insertion tube includes a flexing structure or a tip-deflection portion formed of articulated vertebrae enabling the orientation of the distal head using one or more actuating cables mounted inside the insertion tube. Each actuating cable includes a first end fixed to the distal head and a second end on which a control mechanism acts, which is fitted to the handle in order to ensure the sliding of the cables and, consequently, the folding of this tip-deflection portion in order to orient the distal head.

The manufacture of this tip-deflection portion requires the assembly of vertebrae leading to a difficult assembly and high manufacturing cost. This manufacturing difficulty appears all the more so in many applications where there appears a need to miniaturize such an endoscope to enable it to pass through a reduced diameter access path. This miniaturisation must take account of the necessity to mount, inside the insertion tube, various equipment suitable for enabling various functions to be performed, such as fluid supply, fluid suction, instrument supply, the collection of samples or surgical operations and the passage of the connections for the vision system.

Patent U.S. Pat. No. 5,002,041 describes an endoscope, the tip-deflection portion of which includes two nested springs for obtaining an offset between the turns of the springs in order to provide a space for the mounting of a cable which is thus guided in translation. Such a solution leads to a relatively bulky tip-deflection portion which does not allow the cross-section of the endoscope to be reduced without the risk of altering the operation of the equipment positioned inside the insertion tube.

Patent application WO 2014/061842 describes an endoscope including a tip-deflection portion formed, in particular, by a helical spring, the turns of which are provided with concave deformations aligned to serve as a guide for an actuating cable. The producing of these concave deformations on a spring leads to a manufacturing difficulty and to a high manufacturing cost, in particular for low-diameter insertion tubes.

It is also known, in particular through documents EP 1 604 607, CN 107951456, CN 104605805, CN 107520273 and EP 3 195 784, to produce the tip-deflection portion or the flexing structure, using a tube cut by energy-beam cutting lines in order to produce tubular vertebrae that nest in one another by cut-out areas forming rotation pivots along pivot axes. Notches are produced between the tubular vertebrae, cut in the tube to form flexing zones for the tubular vertebrae in order to obtain the flexing of the flexing structure in at least one flexing plane perpendicular to the pivot axes. Such a flexing structure has a low manufacturing cost while being able to have a reduced cross-section.

However, a difficulty appears in ensuring the assembly of the actuating cable in a position suitable for providing a tip-deflection capacity at the distal head over a large angular range. Indeed, it is noted that the actuating cable slides inside a protective sheath that is fixed during tip-deflection operations. As a result, the positioning of the actuating cable must be such that, on the one hand, its sliding movement can cause the tip deflection of the flexing structure over the entire desired angular range and, on the other hand, the friction with the sheath must be limited.

In a complementary manner, a difficulty arises for assembling such a flexing structure with the insertion tube on one side and the distal head on the other side. Indeed, such an assembly must be reliable and effective whilst having a limited size.

SUMMARY

The present disclosure thus aims to overcome the disadvantages of the state of the art by proposing a flexing structure for a catheter-type or endoscope-type medical device, having a low manufacturing cost while being able to have a reduced cross-section for its passage into a low-diameter access path while providing a sufficient tip-deflection capability at the distal head without altering the various equipment implemented by this endoscope.

In order to attain such an objective, the flexing structure for an insertion tube of a medical device, includes tubular vertebrae with a proximal tubular vertebra and a distal tubular vertebra and at least one actuating cable surrounded by a sheath over at least part of its length, the flexing structure including a tube cut with energy-beam cutting lines to create tubular vertebrae that nest in one another via cut-out areas forming pivots for rotation around pivot axes, cutting lines being created to delimit, between the tubular vertebrae, notches cut in the tube in order to form flexing zones for the tubular vertebrae in order to obtain the flexing of the flexing structure in at least one flexing plane perpendicular to the pivot axes, the proximal tubular vertebra including, for each actuating cable, a radial and axial blocking system for the sheath, including an elongate cutout created in such a way as to delimit two stop edges that limit the radial engagement of the sheath in the cutout, this cutout opening at its distal part into a slot delimited by at least two cutout lines between which there is attached a pressing tab designed to press the sheath radially against the two stop edges of the cutout, this slot being bordered by a rim for axially stopping the sheath, on which the distal end of the sheath is pressed.

Advantageously, the proximal tubular vertebra includes, at its proximal end, connection tabs extending axially and including a radial deformation for engaging in the distal part of the insertion tube.

According to an embodiment, the proximal tubular vertebra includes two neighbouring tabs, teeth including end edges abutting on the distal end edge of the insertion tube.

According to an alternative embodiment, the distal tubular vertebra is provided with a positioning system of the actuating cable for its welding on the distal tubular vertebra, this positioning system including a pressing tab cut from the tube by two parallel cutout lines, while remaining attached to the tube at its ends by attachment zones and two counter tabs extending on either side of the pressing tab, each being cut from the tube by two parallel cutout lines, while remaining attached to the tube at its ends by attachment zones, the actuating cable being positioned before welding between the counter tabs and the pressing tab, at least one weld enabling fusing of the actuating cable to the pressing tab.

Advantageously, the distal tubular vertebra is provided with an assembly system with a distal head including at least two insertion cutouts for a finger of the distal head, created opening at the distal part by an engagement channel for the finger, at least one cutout having two blocking points for a finger of the distal head, extending on either side of the engagement channel of this cutout.

According to a first embodiment, the tube is cut by a first series of cut-out areas forming rotation pivots and by a second series of cut-out areas forming rotation pivots extending diametrically opposite with respect to the first series in order to form first pivot axes, cutting lines being created to delimit, between the tubular vertebrae, at least one first series of notches to form flexing zones for the tubular vertebrae in order to obtain the flexing of the flexing structure in one sense of the direction perpendicular to the first pivot axis.

According to the disclosure, the cut-out areas forming rotation pivots cooperate with one another via their thickness.

According to a preferred embodiment, the tubular vertebrae include at least one tab cut from the tube by two parallel cutout lines, while remaining attached to the tube at its ends by attachment zones, the tab being pushed back inside the tube in order to constitute a guide eye for the actuating cable.

Another object of the disclosure is to propose an insertion tube of a medical device including a flexing structure according to the disclosure, fixed at its proximal end to the tube and at its distal end to a distal head.

Another object of the disclosure is to propose a control handle for a medical device, equipped at its distal part with an insertion tube according to the disclosure.

Various other features arise from the description given below with reference to the appended drawings which show, by way of non-limiting examples, embodiments of the subject matter of the disclosure.

DETAILED DESCRIPTION

Figure 1:
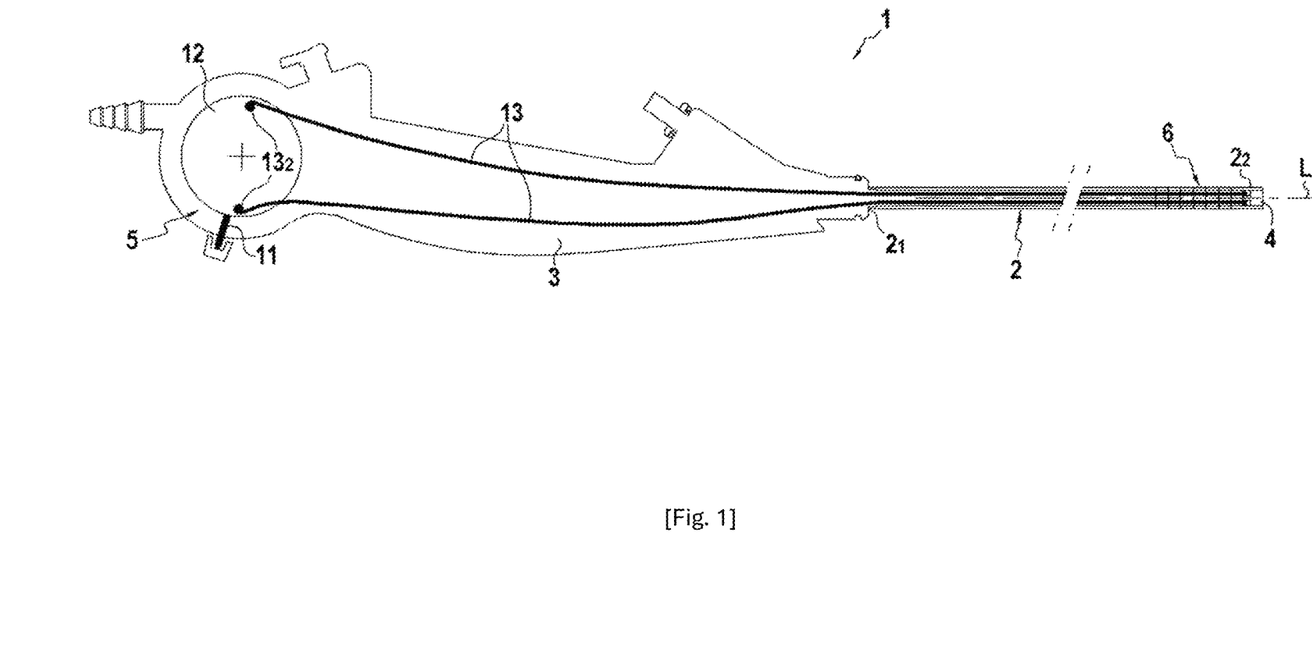
FIG. 1 is a general schematic view of a catheter-type or endoscope-type medical device in the general sense, equipped with a flexing structure according to the disclosure.

FIG. 1 illustrates, by way of example, a medical device 1 of the endoscope or catheter type 1 in the general sense, designed for accessing the inside of a body such as a cavity or a channel, for example. Conventionally, an endoscope-type or catheter-type medical device 1 includes an insertion tube 2 having, on one side, a proximal part $2_1$ connected to a control handle 3 and, on the opposite side, a distal part $2_2$, which is equipped with a distal head 4. The insertion tube 2 is fixed in a temporary or permanent manner on the control handle 3. This insertion tube 2, which has a greater or lesser length and flexibility, is intended to be introduced into a natural or artificial pathway with a view to carrying out varied operations or functions for therapeutic, surgical or diagnostic purposes. The insertion tube 2 is made of a semi-rigid material and has a length adapted to the length of the conduit to be inspected and can be between 5 cm and 2 m long. The insertion tube 2 has various cross-sectional shapes, such as square, oval or circular. This insertion tube 2, which is in contact with tissues, human organs or medical equipment (trocars or probes), is essentially for single or multiple use by a patient or is even reusable use after decontamination, disinfection or sterilisation.

According to a preferred exemplary embodiment, the medical device 1 according to the disclosure is an endoscope including a vision system capable of lighting and returning an image of the distal part of the insertion tube 2. The endoscope thus includes a vision system mounted inside the control handle 3 and penetrating inside the insertion tube 2 up to the distal head 4. Similarly, the medical device 1 also includes, inside the insertion tube 2, an operator or work channel extending from the control handle 3 to the distal head 4 in order to allow the supply of various tools and/or fluids and/or the suction of fluids.

Conventionally, the medical device 1 also includes a control mechanism 5 for orienting the distal head 4 with respect to the longitudinal axis L of the insertion tube 2. For this purpose, the insertion tube 2 includes, upstream of the distal head 4, a flexing structure, for folding or tip-deflecting 6 according to the disclosure enabling the orienting of the distal head 4 relative to the longitudinal axis L of the insertion tube 2.

Figure 7:
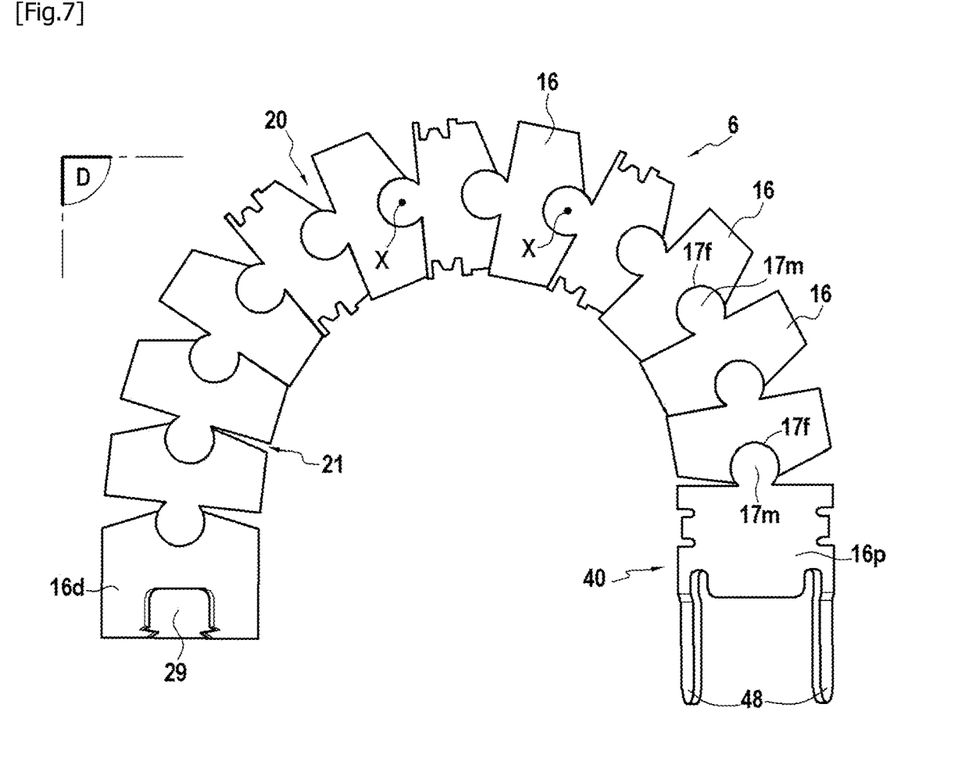
FIG. 7 is a plan view showing the flexing structure illustrated in FIG. 5, in the flexed or tip-deflected position.
Figure 8:
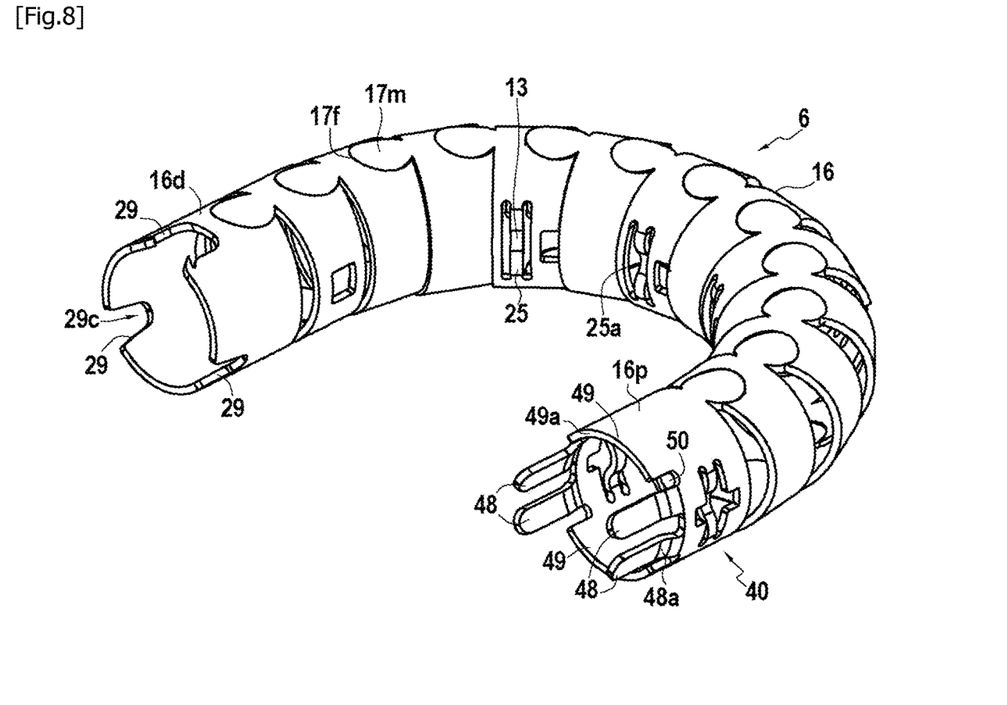
FIG. 8 is a perspective view showing the flexing structure illustrated in FIG. 5, in the flexed or tip-deflected position.

The control mechanism 5 can be produced in any appropriate manner so that the distal head 4 can be moved between a rest position in which the insertion tube 2 is rectilinear (FIG. 2) and a tip-deflected position in which the tip-deflection portion 6 is curved (FIGS. 7, 8). By way of non-limiting example, the control mechanism 5 can correspond to the control mechanism described in patent FR 3 047 887. To this end, the control mechanism 5 includes a manual control lever 11 rotating at least one pivoting part such as a pulley 12 on which is fixed at least one actuating cable 13 mounted inside the insertion tube 2 in order to be fixed at the distal head 4. Typically, each actuating cable 13 is surrounded by a sheath 13g over at least part of its length.

According to a preferred embodiment illustrated by the figures, the flexing structure 6 includes a tube 15 cut by cutting lines T coming from an energy beam in order to produce rings or tubular vertebrae 16 that nest in one another via a first series of cut-out areas 17m, 17f forming rotation pivots and by a second series of cut-out areas 18m, 18f also forming rotation pivots. The cut-out areas 17m, 17f of the first series extend diametrically opposite relative to the cut-out areas 18m, 18f of the second series in order to form a first pivot axis X. Hence, two neighbouring tubular vertebrae 16 are able to pivot relative to one another about a first pivot axis X passing through a rotation pivot 17m, 17f of the first series and through a rotation pivot 18m, 18f of the second series. By convention, it is considered that the tube 15 has, at rest, a plane of symmetry S in which the first pivot axes X are located extending parallel to one another.

Advantageously, each series of cut-out areas alternately includes male cut-out areas 17m, 18m nested inside female cut-out areas 17f, 18f respectively. Hence, a tubular vertebra 16 includes two male cut-out areas 17m, 18m located diametrically opposite, cooperating with two female cut-out areas 17f, 18f also arranged diametrically opposite in the adjacent tubular vertebra 16. Of course, the shapes of the male cutouts 17m, 18m are congruent or complementary to the shapes of the female cutouts 17f, 18f in order to enable a relative rotation between two neighbouring tubular vertebrae 16 and a nesting between two neighbouring tubular vertebrae 16.

It should be understood that the cut-out areas 17m, 17f, 18m, 18f form rotation pivots cooperating with one another via their thickness. In other words, a male cutout area 17m, 18m is in contract or pressed via its edge with the edge of the female cutout area 17f, 18f. As shown in the exemplary embodiment illustrated in FIGS. 2 to 10, the shapes of the male cutouts 17m, 18m are portions of discs of angular extent greater than 180° (for example between 200° and 300°) in order to be nested in portions of rings or bearings.

It should be understood that the flexing structure 6 is obtained on the basis of a single tube 15 extending along a rectilinear longitudinal axis L and having a preferably circular cross-section. The tube 15 has a thickness suitable for being cut through its entire thickness by an energy beam of all types known per se, such as a plasma beam, a water jet or preferably by a laser beam. For example, the tube 15 is cut by $CO_2$ or YAG laser. The tube 15 has a material thickness between 0.05 and 2 mm. The tube 15 has a diameter between 1 mm and 20 mm, for example.

Similarly, the tube 15 is made of a material suitable for being cut by an energy beam while having the mechanical flexing and mechanical strength properties necessary for the flexing structure 6. For example, the tube 15 is made of stainless steel.

Figure 2:
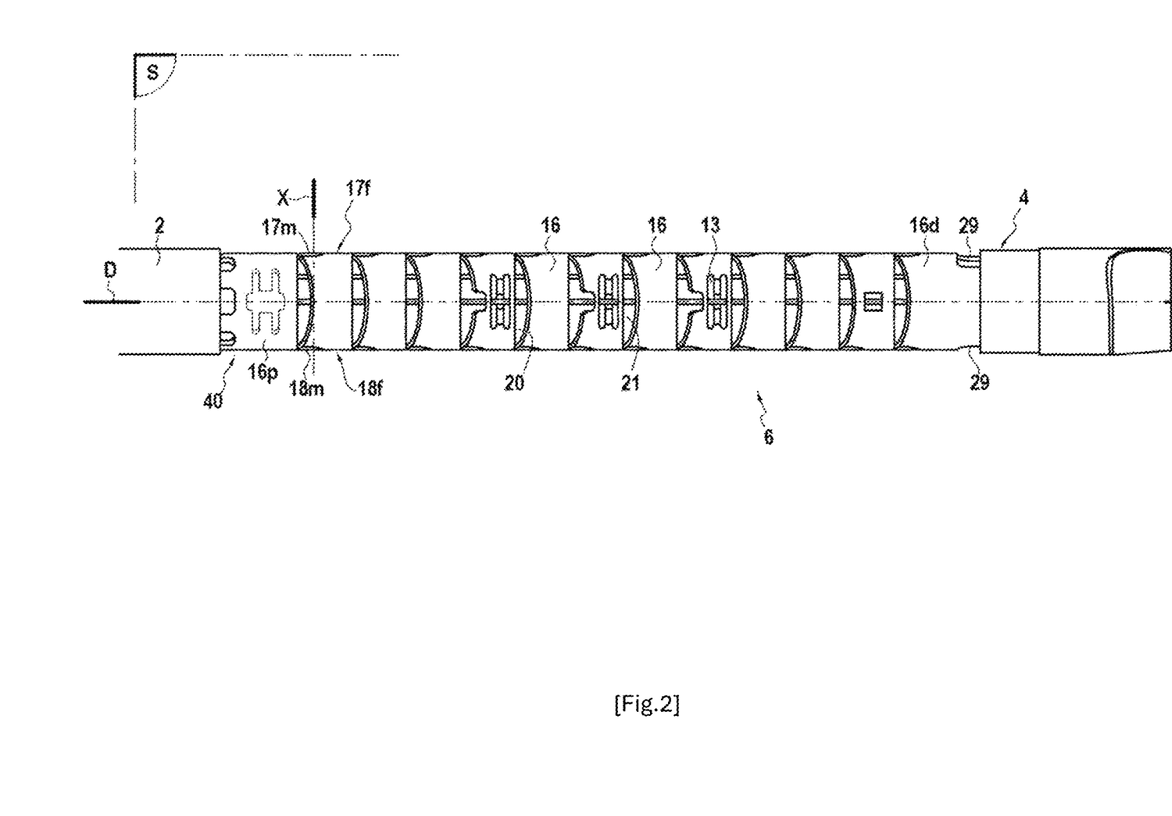
FIG. 2 is a side view showing, more particularly, a preferred embodiment of a flexing structure according to the disclosure.
Figure 3:
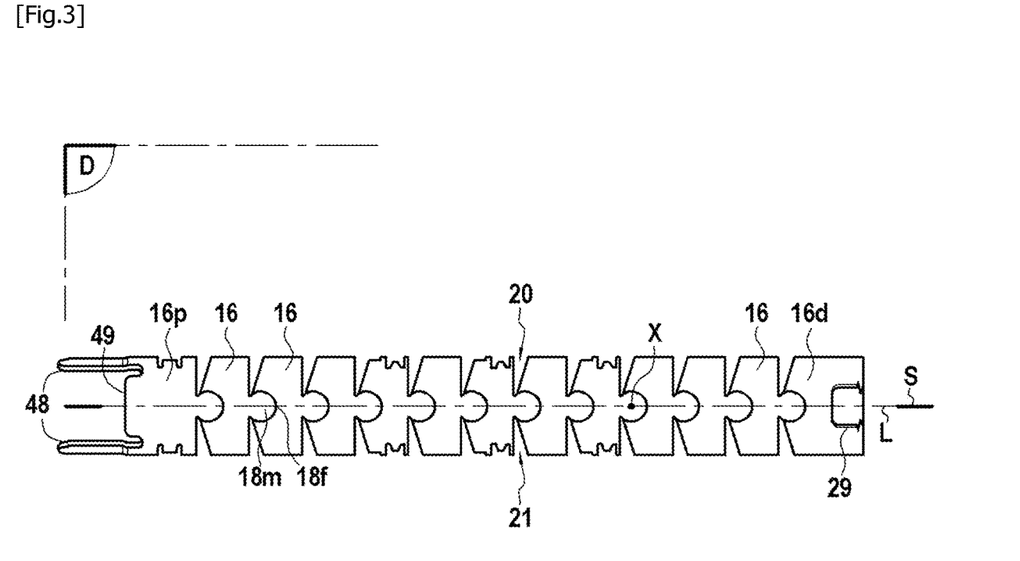
FIG. 3 is a side view of the flexing structure according to the disclosure illustrated in FIG. 2.
Figure 4:
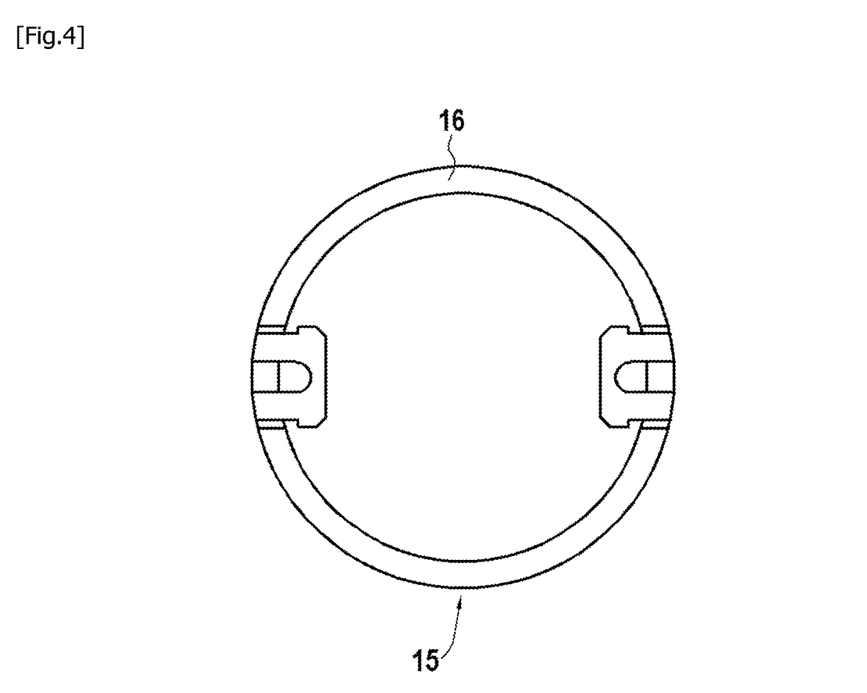
FIG. 4 is a cross-sectional view of the flexing structure according to the disclosure illustrated in FIG. 3.

As can be seen from FIGS. 2 and 3, the cutting lines T are created to form, in the tube, a series of tubular vertebrae 16 that are juxtaposed with respect to one another with a so-called distal tubular vertebral 16d and a so-called proximal tubular vertebra 16p. The flexing structure 6 thus includes, at its distal end, a distal tubular vertebra 16d intended to be fixed to the distal head 4 of the medical device and, at its proximal end, a proximal tubular vertebra 16p intended to be fixed to the distal end of the insertion tube 2. For example, the flexing structure 6 mounted between the tube 2 and the distal head 4 is inserted inside a sheath or a protective shell. Preferably, apart from the distal tubular vertebra 16d and the proximal tubular vertebra 16p, the tubular vertebrae 16 all have the same width measured along the longitudinal axis L. For example, these tubular vertebrae 16 have a width between, for example, 1 and 25 mm.

As can be seen from the exemplary embodiment illustrated in FIGS. 2 to 10, the cutting lines T are created in the tube 15 in order to produce a first series of notches 20 and a second series of notches 21 cut in the tube and extending symmetrically on either side of the plane of symmetry S in order to form flexing zones for the tubular vertebrae 16. In other words, the notches 20, 21 are designed to allow the pivoting of the tubular vertebrae with respect to one another around the first pivot axis X, along a diametral flexing plane D perpendicular to the first pivot axis X. The tubular structure 6 thus includes, on one side of the first plane of symmetry S, the notches 20 of the first series separating, two-by-two, the tubular vertebrae 16 and, on the other side of the plane of symmetry S, the notches 21 of the second series separating, two-by-two, the tubular vertebrae 16.

Preferably, the notches 20 of the first series are produced according to an identical angular extension range. Similarly, the notches 21 of the second series are produced according to an identical angular extension range. Advantageously, the notches 20 of the first series and the notches 21 of the second series are produced according to an identical angular extension range. Advantageously, the notches 20 of the first series and the notches 21 of the second series are centred with respect to the diametral plane D passing through the diameter of the tube and perpendicular to the plane of symmetry S.

It is clear from the preceding description that the notches 20, 21 are created in the tube 15 with a removal of material. Preferably, the notches 20 of the first series are produced with a cut having identical dimensions and shape. Similarly, the notches 21 of the second series are produced with a cut having identical dimensions and shape. Advantageously, the notches 20 of the first series and the notches 21 of the second series are produced with a cut having identical dimensions and shape. The notches 20 of the first series and the notches 21 of the second series are produced by oblong-shaped or tapered cutouts, suitable for enabling a relative pivoting between two adjacent tubular vertebrae 16 along the first pivot axes X.

As shown more precisely in FIG. 3, each notch 20, 21 between two adjacent tubular vertebrae 16 results from a cutout created uniquely in the outer edge of a tubular vertebra 16. Of course, each notch 20, 21 between two adjacent tubular vertebrae 16 can result from a cutout created in the outer edge of two neighbouring tubular vertebrae 16.

In the exemplary embodiments illustrated in FIGS. 2 to 10, the tubular structure 6 includes a first series of notches 20 and a second series of notches 21 in order to obtain the flexing of the flexing structure in the two senses of the direction perpendicular to the first pivot axis X. Of course, a tubular structure can be produced including a unique series of notches in the case where the tubular structure 6 is provided with a unique actuating cable 13 in order to obtain the flexing of the flexing structure in a single sense of the direction perpendicular to the first pivot axis X. Furthermore, in the exemplary embodiment illustrated in FIGS. 2 to 8, the tubular vertebrae 16 are articulated along only the first pivot axis X in order to obtain the flexing of the flexing structure in a perpendicular plane, namely the diametral flexing plane D.

Figure 9:
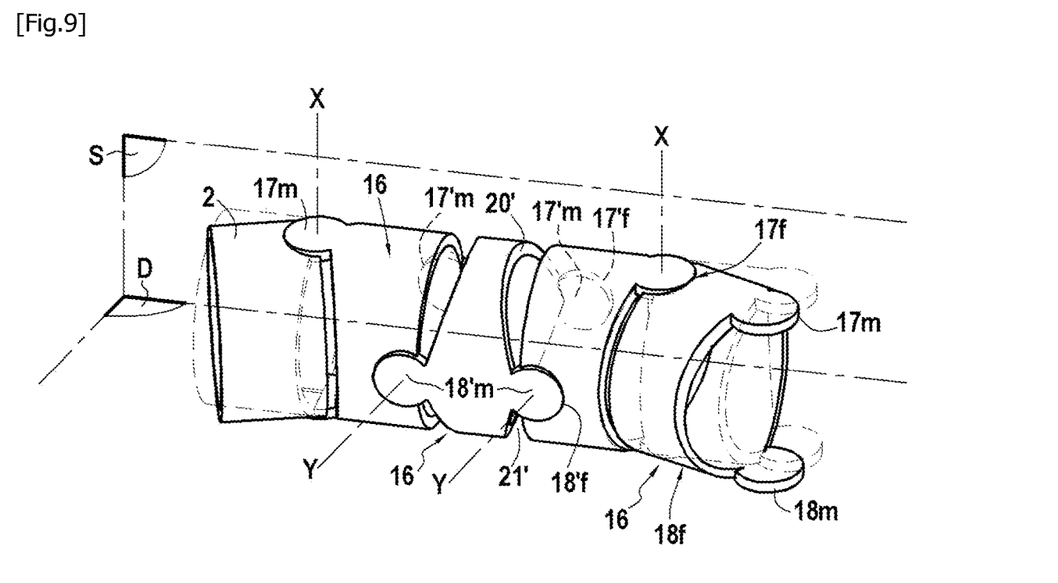
FIG. 9 is a perspective view of an alternative embodiment of the flexing structure according to the disclosure.
Figure 10:
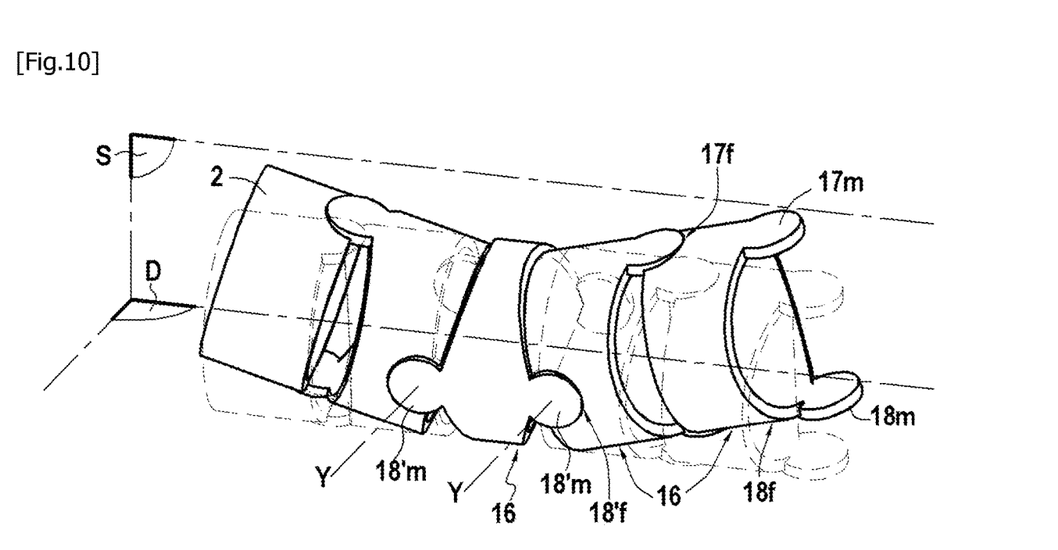
FIG. 10 is an analogous view of the flexing structure illustrated in FIG. 9, shown in a tip-deflected position offset by 90°.
Figure 11:
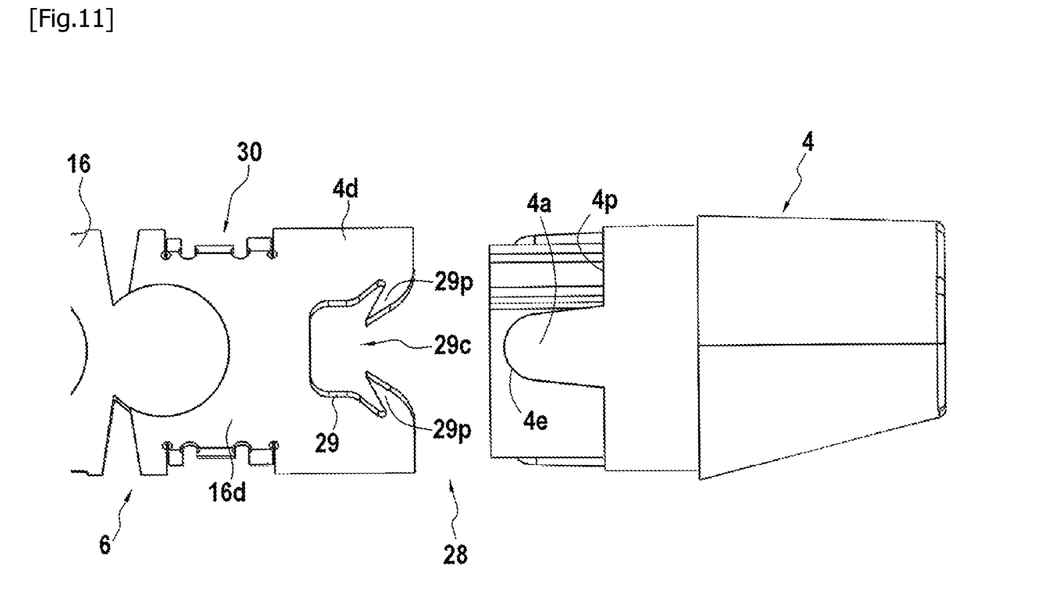
FIG. 11 is a plan view showing the distal head and the flexing structure before their assembly.

According to another alternative embodiment, a tubular structure 6 can be produced which is suitable for allowing flexing in two mutually perpendicular planes using three or four actuating cables 13 with a view to obtaining the left-right and up-down movement of the distal head 4. FIGS. 9 and 10 illustrate such an exemplary embodiment for which the tube 15 is cut in order to include a third series of cut-out areas 17'm, 17'f forming rotation pivots and by a fourth series of cut-out areas 18'm, 18'f forming rotation pivots extending diametrically opposite with respect to the third series and in a plane perpendicular to the first plane of symmetry S, namely the diametral flexing plane D. Hence, two neighbouring tubular vertebrae 16 equipped with cut-out areas 17'm, 17'f of the third series and cut-out areas 18'm, 18'f of the fourth series are able to pivot relative to one another about a second pivot axis Y passing through a rotation pivot 17'm, 17'f of the third series and through a rotation pivot 18'm, 18'f of the fourth series, this second pivot axis Y being perpendicular with respect to the first pivot axis X.

The cut-out areas 17'm, 17'f of the third series and the cut-out areas 18'm, 18'f of the fourth series can be produced on tubular vertebrae 16 already provided with cut-out areas 17m, 17f of the first series and cut-out areas 18m, 18f of the second series or on tubular vertebrae 16 devoid of cut-out areas 17m, 17f of the first series and cut-out areas 18m, 18f of the second series, as illustrated, by way of example, in FIGS. 9 and 10. In this last case, the alternating of the tubular vertebrae 16 between those allowing a rotation along the first pivot axis X and those allowing a rotation along the second pivot axis Y is chosen to obtain the desired flexing radius.

Cutting lines are created to delimit, between the tubular vertebrae 16, a third series of notches 20' and a fourth series of notches 21' cut in the tube and extending symmetrically on either side of the diametral flexing plane D to form flexing zones for the tubular vertebrae in order to obtain the flexing of the flexing structure in a flexing plane perpendicular to the diametral flexing plane D, in other words in the plane of symmetry S (FIG. 10).

This third series of cut-out areas 17'm, 17'f and the fourth series of cut-out areas 18'm, 18'f have the same properties as the cut-out areas 17m, 17f of the first series and the cut-out areas 18m, 18f of the second series. In the illustrated example, the cut-out areas 17'm, 17'f of the third series and the cut-out areas 18'm, 18'f of the fourth series have the same embodiment, but it is clear that the cut-out areas 17'm, 17'f of the third series and the cut-out areas 18'm, 18'f of the fourth series can be produced differently from the cut-out areas 17m, 17f of the first series and the cut-out areas 18m, 18f of the second series.

The cut-out areas of the third and fourth series 17'm, 17'f, 18'm, 18'f form rotation pivots cooperating with one another via their thickness. Similarly, the cut-out areas of the third and fourth series 17'm, 17'f, 18'm, 18'f forming rotation pivots alternately include male cut-out areas 17'm, 18'm nested in female cut-out areas 17'f, 18'f.

In general, it is clear from the preceding description that the tube 15 is cut by energy-beam cutting lines T in order to produce tubular vertebrae 16 that nest in one another via cut-out areas 17m, 17f, 18m, 18f, 17'm, 17'f, 18'm, 18'f forming rotation pivots along two mutually perpendicular pivot axes X, Y. The cutting lines are created to delimit, between the tubular vertebrae 16, notches 20, 21, 20',21' cut in the tube to form flexing zones for the tubular vertebrae in order to obtain the flexing of the flexing structure in at least one flexing plane D, S perpendicular to the pivot axes X, Y.

The tubular structure 6 thus includes a series of tubular vertebrae 16 slotted into one another, directly at the cutting outlet, without requiring operations for assembling the tubular vertebrae 16 to one another. The tubular vertebrae 16 are thus assembled together by slotting into one another. The notches 20, 21, 20',21' form flexing zones in order to obtain the flexing of the flexing structure in at least one diametral flexing plane D, S perpendicular to the pivot axis X, Y (FIGS. 7 to 10). This tubular structure 6 has a reduced cost and can have reduced diameters provided that it does not require any operation for assembling tubular vertebrae 16 to one another.

Figure 6:
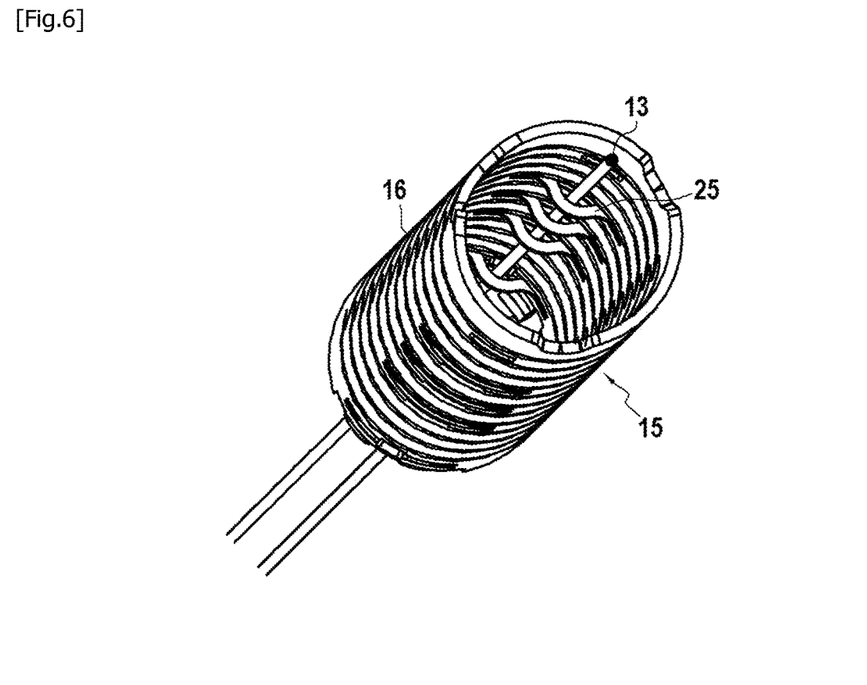
FIG. 6 is a perspective view of the inside of the flexing structure according to the disclosure illustrated in FIG. 5.

According to an advantageous embodiment feature, some of the tubular vertebrae 16 include at least one tab 25 cut out of the tube 15 by two parallel cutout lines 25a, while remaining attached to the tube at its ends via attachment zones 25b. Each tab 25 is pushed back inside the tube in order to form a guide eye for the actuating cable 13. For example, each tab 25 thus has, from the attachment zones 25b, a segment curved towards the inside of the tube and connecting together via a central concave part (FIG. 6).

According to an advantageous embodiment feature, each tab 25 is produced in an angular extension range centred on the extension range of neighbouring notches 20, 21, 20',21'. Hence, the tabs 25 are centred with respect to the flexing plane. For each actuating cable 13, several tabs 25 are created along a generatrix of the tube in order to ensure the guiding in translation of the actuating cable. In the example illustrated in FIGS. 2 to 8, each actuating cable 13 is guided by three tabs 25. Hence, three tubular vertebrae 16 include two tabs 25 arranged symmetrically on either side of the plane of symmetry S while being centred with respect to the diametral plane D. Of course, the tabs 25 can be created on a different number of tubular vertebrae 16. Similarly, in the illustrated example, the tubular vertebrae 16 provided with guide tabs 25 are separated, two-by-two, by a tubular vertebra 16 that is not provided with a guide tab. It is clear that the tabs 25 can be produced on the tubular vertebrae 16 according to a different distribution. It should be understood that a series of tabs 25 is produced along a generatrix of the tube for each of the actuating cables 13 equipping the flexing structure 6.

Figure 12:
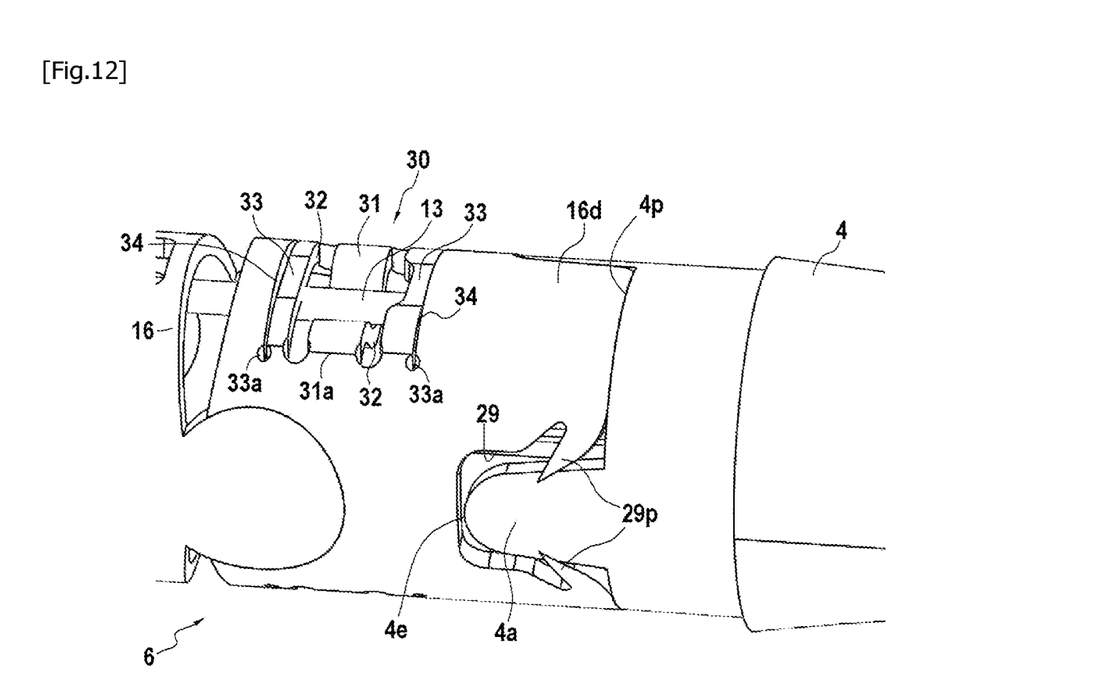
FIG. 12 is a perspective view showing the assembly of the distal head with the flexing structure.

According to another advantageous embodiment feature, the flexing structure 6 includes a distal tubular vertebra 4d provided with an assembly system 28 with the distal head 4 including at least two insertion cutouts 29 for the fingers 4a of the distal head 4. These cutouts 29 are created in the distal tubular vertebra 16d, each opening to the distal part of the distal tubular vertebra 16d via an engagement channel 29c. In the example illustrated in FIG. 8, three cutouts 29 are created delimiting three engagement channels 29c distributed in a regular manner along the circumference of the distal tubular vertebra 16d. Each channel 29c has, starting from the distal part of the distal tubular vertebra 16d, a frustoconical section which narrows towards the bottom of the channel 29c. The distal head 4 also includes at least two fingers 4a and, in the illustrated example, three fingers 4a projecting out from a proximal edge 4p of the distal head 4, with an angular distribution identical to the distribution of the cutouts 29. Each finger 4a is designed to have, in the direction of a rounded end 4e, a frustoconical section complementary to the frustoconical section of the engagement channel 29c and suitable for engaging in the channel 29c until the proximal edge 4p of the distal head abuts against the distal end of the distal tubular vertebra 16d (FIG. 12). The engagement of the fingers 4a of the distal head 4 in the cutouts 29 of the distal tubular vertebra 4d ensures a radial orientation between the flexing structure 6 and the distal head 4 and a blocking of the rotation between these two parts.

According to another feature of the assembly system 28, at least one cutout 29 and, in the illustrated example, one cutout 29 is designed to have two blocking points 29p for a finger 4a of the distal head, extending on either side of the engagement channel 29c and substantially oriented towards the bottom of the cutout 29. During the engagement of the finger 4a inside the engagement channel 29c at the time of a movement in translation, the points 29p penetrate into the edges of the finger 4a ensuring the blocking of the distal head 4 with respect to the flexing structure 6, in the extraction direction. The cooperation between the points 29p and the fingers 4a ensures the axial extraction prevention of the distal head with respect to the flexing structure 6. The distal head 4 can thus be easily and reliably attached to the flexing structure 6 according to the disclosure. Moreover, as explained above, this distal tubular vertebra 16d provided with the assembly system 28 can be obtained directly at the cutting outlet, without implementing additional manufacturing steps.

Figure 5:
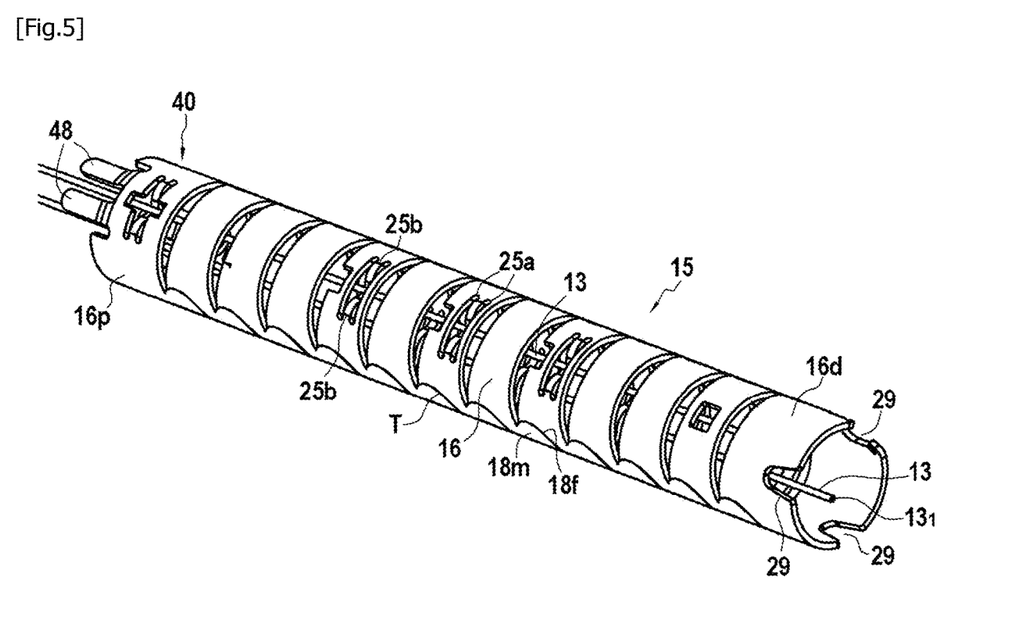
FIG. 5 is a perspective view of the flexing structure according to the disclosure illustrated in FIG. 3.

According to another advantageous embodiment feature, the flexing structure 6 includes a distal tubular vertebra 16d on which is welded an end $13_1$ of at least one and, in the illustrated example, two actuating cables 13, as illustrated in FIG. 5. Of course, in the case where the flexing structure 6 is provided with three or four actuating cables 13, the ends of the actuating cables can be welded on the distal tubular vertebra 16d. Conventionally, the actuating cable 13 is made of stainless steel. The welding of the end of the actuating cable 13 can be carried out in any appropriate manner, such as by the spot welding technique (technique using the principle of welding by resistance) or by laser welding. Of course, the ends $13_2$ of the actuating cables 13 are fixed to the pulley 12 using any suitable type of fixing.

Figure 13:
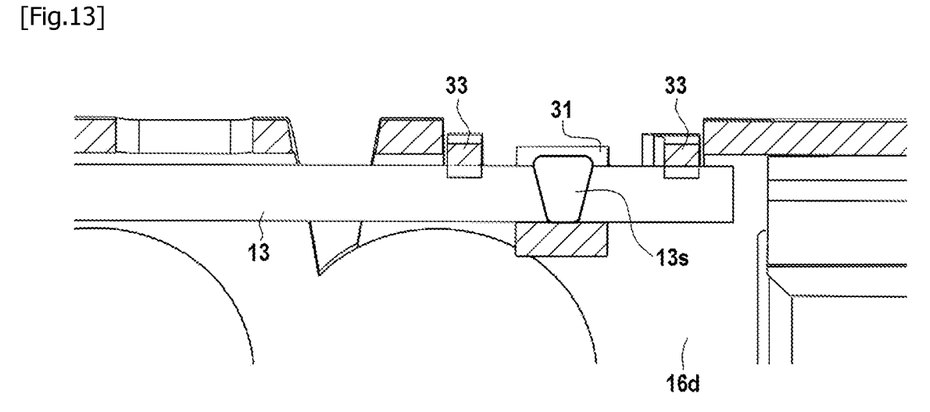
FIG. 13 is a sectional half view showing the assembly of the actuating cable in order to promote its welding on the distal tubular vertebra.

According to an advantageous embodiment feature illustrated more precisely in FIGS. 12 and 13, the flexing structure 6 includes a distal tubular vertebra 16d provided with a positioning system 30 of the actuating cable 13 for enabling its correct welding on the distal tubular vertebra 16d. This positioning system 30 includes a radial pressing tab 31 cut from the tube by two parallel cutout lines 32, while remaining attached to the tube at its two ends by attachment zones 31a. The pressing tab 31 is thus pushed back inside the distal tubular vertebra 16d to enable the positioning of the actuating cable 13 on the outer surface of the pressing tab 31, so that the actuating cable 13 is accessible from outside the tube 15. More specifically, the actuating cable 13 is pressed on this tab 31 by two counter tabs 33 extending radially on both sides of the pressing tab 31, while each being cut from the tube by two parallel cutout lines 34, and while remaining attached to the tube at its two ends by attachment zones 33a. These two counter tabs 33 ensure a good contact of the actuating cable 13 with the pressing tab 31 ensuring an effective welding of the actuating cable 13 on the distal tubular vertebra 16d. By way of example, FIG. 13 shows the production of a weld 13s, advantageously by slot welding, enabling the actuating cable 13 to be fused to the pressing tab 31 of the tube 15. Moreover, as explained above, this distal tubular vertebra 16d provided with the positioning system 30 can be obtained directly at the cutting outlet, without implementing additional manufacturing steps.

Figure 13A:
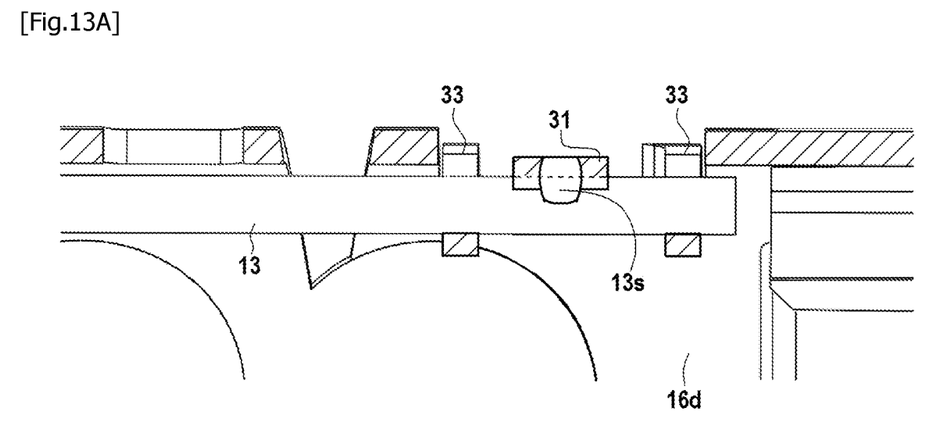
FIG. 13A is a sectional half view showing another assembly of the actuating cable in order to promote its welding on the distal tubular vertebra.

FIG. 13A illustrates an alternative positioning of the actuating cable 13 to enable its correct welding on the distal tubular vertebra 16d. According to this alternative, the actuating cable 13 is supported by the two counter tabs 33 which extend radially on either side of the pressing tab 31. The pressing tab 31 is pushed back inside the distal tubular vertebra in order to press, via its inner surface, on the actuating cable 13. The pressing tab 31 is thus deformed in order to correctly position the actuating cable 13 before welding. A weld 13s thus enables the actuating cable 13 to be fused to the pressing tab 31 of the tube 15. Hence, the actuating cable 13 is positioned before welding between the counter tabs 33 and the pressing tab 31, and at least one weld 13s enables the actuating cable 13 to be fused to the pressing tab 31.

Figure 14:
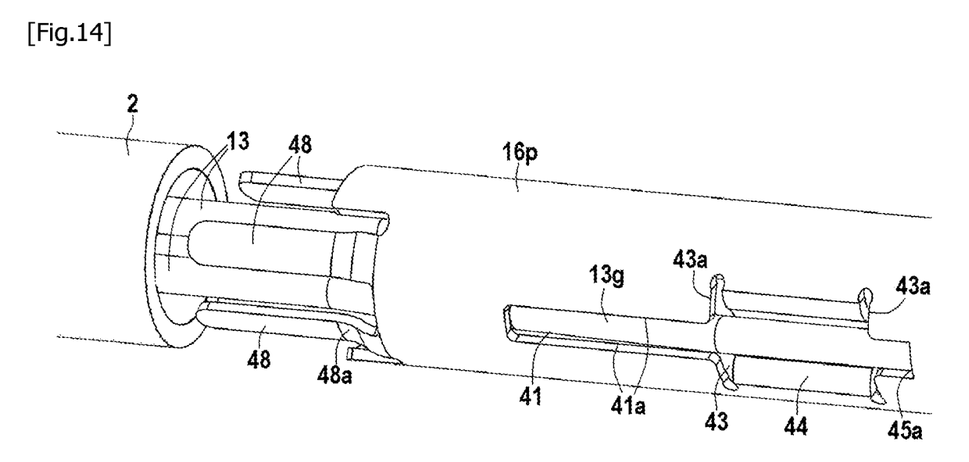
FIG. 14 is a perspective view showing the insertion tube and the flexing structure before their assembly.
Figure 15:
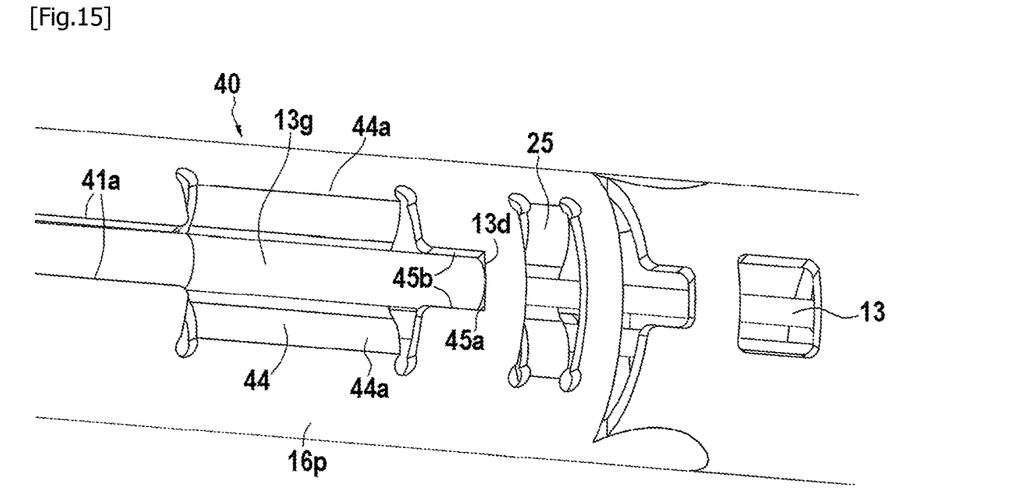
FIG. 15 is a perspective view showing the positioning of the actuating cable in the proximal tubular vertebra of the flexing structure.
Figure 16:
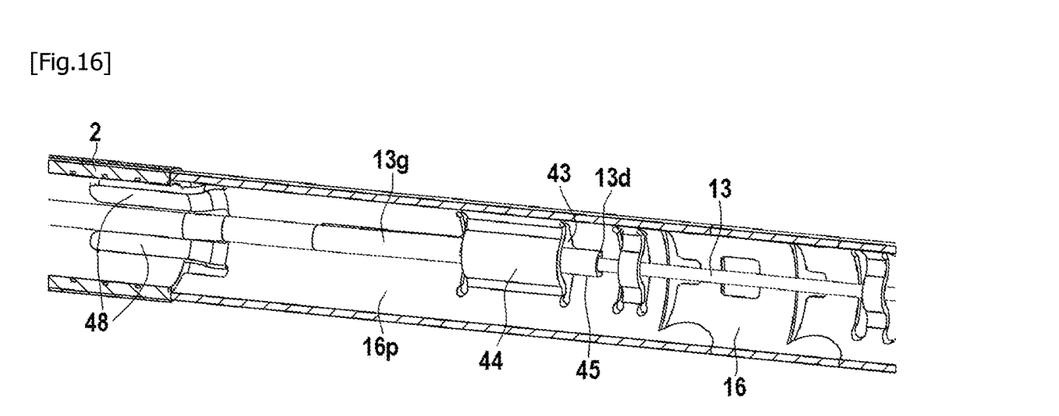
FIG. 16 is a perspective view of the inside showing the positioning of the actuating cable in the proximal tubular vertebra of the flexing structure.

According to a feature of the disclosure that is illustrated more particularly in FIGS. 14 to 16, the proximal tubular vertebra 16p includes, for each actuating cable 13, an axial and radial blocking system 40 for the sheath 13g surrounding each actuating cable 13. This axial and radial blocking system 40 includes a cutout 41 created axially in the proximal tubular vertebra 16p, parallel to its longitudinal axis. This cutout 41 is elongate in shape and is delimited by two so-called stop edges 41a extending parallel to one another and to the longitudinal axis of the proximal tubular vertebra 16p. The width of this cutout between its stop edges 41a is determined in order to allow a partial engagement of the sheath 13g inside the cutout 41. In other words, this cutout 41 is designed to delimit two stop edges 41a limiting the radial engagement of the sheath 13g inside the cutout. As shown more precisely in FIGS. 14 and 15, the sheath 13g is in contact with the stop edges 41a along two of its generatrices by considering that the part of the sheath located between these two generatrices is inserted inside the cutout 41. For example, when the sheath 13g is in abutment against the stop edges 41a, the sheath 13g, via its outermost generatrix, is substantially tangential with the outer surface of the proximal tubular vertebra 16p. It should be noted that such an arrangement frees up space inside the flexing structure 6.

This cutout 41 opens, at its distal part, into a slot 43 delimited by at least two cutout lines 43a created radially in the proximal tubular vertebra 16p in order to delimit between them a pressing tab 44 attached to the proximal tubular vertebra 16p, by its ends using attachment zones 44a. This pressing tab 44 is pushed back inside the proximal tubular vertebra 16p in order to enable the positioning of the sheath 13g of the actuating cable on the outer surface of the pressing tab 44, between the pressing tab 44 and the body of the proximal tubular vertebra 16p. Hence, the pressing tab 44 is designed to radially press the sheath 13g against the two stop edges 41a of the cutout 41.

Furthermore, this slot 43 is bordered by an axial stop rim 45a for the sheath 13g of the actuating cable 13. The sheath 13g has a distal end 13d intended to press on the axial stop rim 45a. It should be understood that beyond this distal end 13d of the sheath 13g, the actuating cable 13 is devoid of the sheath 13g. Advantageously, the axial stop rim 45a is produced by the radial edge of a notch 45 created axially in the proximal tubular vertebra 16p, opening on the proximal side, into the slot 43. This notch 45 is delimited by two support edges 45b extending parallel to one another and to the longitudinal axis of the proximal tubular vertebra 16p. These two support edges 45b are connected to one another on the distal side by the axial stop rim 45a. This notch 45 is designed to enable a partial engagement of the sheath 13g inside the notch 45 and the positioning of the distal end 13d of the sheath 13g against the axial stop rim 45a. The sheath 13g is thus in abutment via substantially half of its distal end 13d against the axial stop rim 45a.

According to an advantageous implementation feature, it should be noted that when the sheath 13g is in abutment against the axial stop rim 45a, it is possible to weld the sheath 13g to the proximal tubular vertebra 16p in such a way as to block the translation of the sheath 13g. To this effect, a weld is produced, for example between the distal end 13d of the sheath 13g on one hand and the axial stop rim 45a and/or the support edges 45b and/or the stop edges 41a of the proximal tubular vertebra 16p on the other.

It should be noted that the pressing tab 44 likewise radially presses the sheath 13g to come into contact against the two support edges 45b, ensuring the positioning of the distal end 13d of the sheath 13g against the axial stop rim 45a. Typically, the notch 45 and the cutout 41 are created in the extension of one another. For example, when the sheath 13g is in abutment against the support edges 45b, the sheath 13g, via its outermost generatrix, is substantially tangential with the outer surface of the proximal tubular vertebra 16p.

It should be noted that the axial stop rim 45a cannot be delimited by the notch 45 as is illustrated in the drawings, but by the distal cutout edge delimiting the slot 43. Preferably, the proximal tubular vertebra 16p is provided, between the axial and radial blocking system 40 and its distal end, with a tab 25 created to ensure the guiding in translation of the actuating cable 13.

It is clear from the preceding description that such an axial and radial locking system 40 can ensure correct positioning of the actuating cable 13 limiting the friction inside the sheath 13g. The blocking system 40 makes it possible to position, without curvature, the actuating cable 13 in order that it is aligned with its part which is guided in translation by the tabs 25. This blocking system 40 also contributes to the radial mechanical strength between the insertion tube 2 and the flexing structure 6. Furthermore, the axial blocking of the sheath 13g against the axial stop rim 45a constitutes a robust stop enabling large forces to pass into the actuating cable.

According to an advantageous embodiment feature, the proximal tubular vertebra 16p includes, at its proximal part, connection tabs 48 extending axially and having a radial flexibility for engaging in the distal part of the insertion tube 2 and ensuring the assembly between the insertion tube 2 and the flexing structure 6. The tabs 48 are distributed over the circumference of the proximal tubular vertebra 16p in a regular or irregular manner. For example, the proximal tubular vertebra 16p includes two pairs of two tabs 48 arranged diametrically opposite. It should be noted that the two tabs 48 of a pair are spaced apart so as to enable their relative positioning and the guiding of an actuating cable 13 as illustrated in FIG. 16.

Each tab 48 has a radial deformation 48a produced, for example, by folds, such that the tab extends substantially parallel to the longitudinal axis of the proximal tubular vertebra 16p but being offset towards the inside of the proximal tubular vertebra. The radial offset of the tabs 48 enables the engaging of the tabs in the distal part of the insertion tube 2 having a diameter substantially identical to the diameter of the proximal tubular vertebra 16p. As shown more precisely in FIG. 17, the proximal tubular vertebra 16p and the insertion tube 2 are thus flush in the assembled position. It should be noted that the assembly by tabs offers the advantage of having a limited size while avoiding the addition of an additional connection part adding to the thickness.

Figure 17:
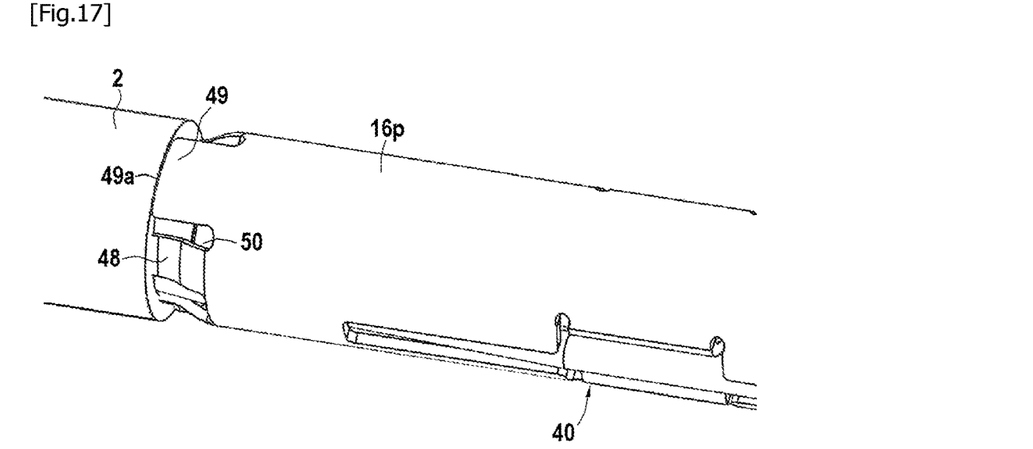
FIG. 17 is a perspective view showing the insertion tube and the flexing structure in the assembled position.

Preferably, the tabs 48 are designed so as to leave teeth 49 between two neighbouring tabs. The teeth 49 are detached from the teeth 49 by cutouts 50, contributing to the flexibility of the tabs 48. In the illustrated example, the proximal tubular vertebra 16p includes two teeth 49 extending in diametrically opposite manner and on either side of which the pairs of tabs 48 are located. The teeth 49 extend axially from the proximal tubular vertebra 16p backwards from the end of the tabs 48, and have end edges 49a together delimiting the proximal edge of the proximal tubular vertebra 16p. The tabs 48 can thus be engaged inside the insertion tube 2 until the end edges 49a of the teeth come into abutment on the distal end edge of the insertion tube 2 (FIG. 17).

It is clear from the preceding description that the subject matter of the disclosure relates to an insertion tube 2 of a medical device 1 including a flexing structure 6 fixed at its proximal end to the insertion tube 2 and at its distal end to the distal head 4. Advantageously, the distal head 4 is assembled to the flexing structure 6 by the point-anchoring type assembly system 28, while the insertion tube 2 is assembled to the flexing structure using the connection tabs 48. As previously explained, the proximal 16p and distal 16d tubular vertebrae as described above can be obtained directly at the cutting outlet, without implementing additional manufacturing steps.

The disclosure is not limited to the examples described and represented, because various modifications can be made thereto without departing from the scope of the disclosure.

The invention claimed is:
1. A flexing structure configured for an insertion tube of a medical device, the flexing structure comprising:
 a tubular vertebrae with a proximal tubular vertebra and a distal tubular vertebra;

at least one actuating cable surrounded by a sheath over at least part of a length of the flexing structure;

a tube cut with lines cut using an energy-beam to create the tubular vertebrae that nest in one another via cut-out areas forming pivots for rotation around pivot axes, the lines being configured to delimit, between the tubular vertebrae, notches cut in the tube to form flexing zones for the tubular vertebrae of the flexing structure in at least one flexing plane perpendicular to the pivot axes, the proximal tubular vertebra comprising:

for each actuating cable, a radial and axial blocking system for the sheath, the radial and axial blocking system comprising:

an elongate cutout configured to delimit two stop edges that limit the radial engagement of the sheath in the elongated cutout,         wherein the elongated cutout opens towards the distal part of the elongated cutout into a slot delimited by at least two cutout lines between which there is attached a pressing tab configured to press the sheath radially against the two stop edges of the elongated cutout, and         wherein the slot is bordered by a rim to axially stop the sheath, the distal end of the sheath being pressed against the rim.

2. The flexing structure according to claim 1, wherein the proximal tubular vertebra comprises, at the proximal part of the proximal tubular vertebra, connection tabs extending axially and comprising a radial deformation configured for engaging in the distal part of the insertion tube.

3. The flexing structure according to claim 2, wherein the proximal tubular vertebra comprises two neighbouring tabs, and teeth comprising end edges abutting on a distal end edge of the insertion tube.

4. The flexing structure according to claim 1, wherein the distal tubular vertebra is provided with a positioning system of the at least one actuating cable configured for the welding of the at least one actuating cable on the distal tubular vertebra, the positioning system comprising an additional pressing tab cut from the tube by two parallel cutout lines, while remaining attached to the tube at its ends by attachment zones and two counter tabs extending on either side of the additional pressing tab each being cut from the tube by two parallel cutout lines, while remaining attached to the tube at its ends by attachment zones, the actuating cable being positioned before welding between the counter tabs and the additional pressing tab, at least one weld enabling fusing of the actuating cable to the pressing tab.

5. The flexing structure according to claim 1, wherein the distal tubular vertebra is provided with an assembly system with a distal head comprising at least two insertion cutouts for a finger of the distal head, the at least two insertions cutouts being configured to open at the distal part by an engagement channel for the finger, at least one cutout having two blocking points for the finger of the distal head, extending on either side of the engagement channel of the cutout.

6. The flexing structure according to claim 1, wherein the tube is cut by a first series of cut-out areas configured for forming rotation pivots and by a second series of cut-out areas configured for forming rotation pivots extending diametrically opposite with respect to the first series to form first pivot axes, cutting lines being configured to delimit, between the tubular vertebrae, at least one first series of notches configured to form flexing zones for the tubular vertebrae to obtain the flexing of the flexing structure in one sense of the direction perpendicular to the first pivot axis.

7. The flexing structure according to claim 6, wherein the cut-out areas configured to form rotation pivots that cooperate with one another via the thickness of the cut-out areas.

8. The flexing structure according to claim 1, wherein the tubular vertebrae comprise at least one tab cut from the tube by two parallel cutout lines, while remaining attached to the tube at the ends of the at least one tab by attachment zones, the at least one tab being pushed back inside the tube to constitute a guide eye for the at least one actuating cable.

9. An insertion tube of a medical device of an endoscope or catheter type, the insertion tube comprising a flexing structure according to claim 1, the flexing structure being fixed at a proximal end of the flexing structure to the insertion tube and at a distal end of the flexing structure to a distal head.

10. A medical device comprising a control handle equipped at a distal part of the control handle with an insertion tube according to claim 9.

* * * * *